United States Patent
Ashihara et al.

(10) Patent No.: US 6,683,533 B1
(45) Date of Patent: Jan. 27, 2004

(54) INTER-VEHICLE DISTANCE MEASURING SYSTEM AND APPARATUS MEASURING TIME DIFFERENCE BETWEEN EACH DETECTION TIME OF SAME ROAD SURFACE CONDITION

(75) Inventors: Jun Ashihara, Wako (JP); Hiroyuki Andou, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 487 days.

(21) Appl. No.: 09/648,056

(22) Filed: Aug. 25, 2000

(30) Foreign Application Priority Data

Aug. 27, 1999 (JP) .............................................. 11-242346

(51) Int. Cl.[7] .............................................. B60Q 1/00
(52) U.S. Cl. ...................... 340/435; 340/436; 340/903; 340/933; 701/301
(58) Field of Search ................. 340/435, 436, 340/437, 903, 933, 941, 942, 943; 701/300, 301

(56) References Cited

U.S. PATENT DOCUMENTS

| | | | | |
|---|---|---|---|---|
| 4,247,768 A | * | 1/1981 | Elmer et al. ............. | 250/222.1 |
| 5,001,683 A | * | 3/1991 | Fukumoto et al. ......... | 368/113 |
| 5,197,562 A | * | 3/1993 | Kakinami et al. ......... | 180/169 |
| 5,215,159 A | * | 6/1993 | Nishida ................. | 180/179 |
| 5,281,964 A | * | 1/1994 | Iida et al. ............. | 340/933 |
| 5,568,136 A | * | 10/1996 | Hochstein et al. ........ | 340/903 |
| 5,587,908 A | * | 12/1996 | Kajiwara ................ | 701/93 |
| 5,675,518 A | * | 10/1997 | Kuroda et al. ........... | 702/97 |
| 5,689,422 A | * | 11/1997 | Heymann et al. .......... | 701/93 |
| 6,130,626 A | * | 10/2000 | Kane et al. ............. | 340/905 |

FOREIGN PATENT DOCUMENTS

| | | |
|---|---|---|
| EP | 0 412 719 A1 | 2/1991 |
| JP | 5087914 | 4/1993 |
| WO | WO 97/21111 | 6/1997 |
| WO | WO 99/42856 | 8/1999 |

* cited by examiner

Primary Examiner—Daryl Pope
(74) Attorney, Agent, or Firm—Carrier, Blackman & Associates, P.C.; Joseph P. Carrier; William D. Blackman (57) ABSTRACT

An inter-vehicle distance measuring apparatus for measuring distance between a target vehicle ahead of a present vehicle following the target vehicle is disclosed, wherein the apparatus is not affected by weather conditions such as rainfall or snowfall. In the apparatus, the target vehicle transmits the first road-surface data, such as the roughness of the road surface, to the present vehicle. Also in the present vehicle, the second road-surface data such as the roughness is also detected, and both detected data are compared. In the present vehicle, the first and second road surface data having the maximum correlation are detected, and the time difference of each detection time of these data is calculated so as to calculate the inter-vehicle distance.

14 Claims, 5 Drawing Sheets

INTER-VEHICLE DISTANCE MEASURING SYSTEM AND APPARATUS MEASURING TIME DIFFERENCE BETWEEN EACH DETECTION TIME OF SAME ROAD SURFACE CONDITION

BACKGROUND OF THE INVENTION

1. Field of the Invention

The present invention relates to an inter-vehicle distance measuring system and apparatus for measuring a distance between a target vehicle (or the first vehicle) and the present vehicle (or the second vehicle) behind the target vehicle.

This application is based on Patent Application No. Hei 11-242346 filed in Japan, the contents of which are incorporated herein by reference.

2. Description of the Related Art

As a conventional inter-vehicle distance measuring apparatus, Japanese Unexamined Patent Application, First Publication, Hei 5-87914 discloses an apparatus using a radar. In the disclosed apparatus, an antenna is attached to the front face of the vehicle, so as to radiate an FM (radio) wave frontward, and generate a beat frequency signal by mixing a reflected wave from a target vehicle ahead of the present vehicle with the original waveform of the radiated FM wave, thereby detecting the position of the target vehicle based on the frequency of the beat frequency signal.

SUMMARY OF THE INVENTION

The present invention provides an inter-vehicle distance measuring system and apparatus employing a completely novel method, that is, completely different from the above conventional method employed in the conventional apparatus, and an objective of the present invention is to provide an inter-vehicle distance measuring apparatus which can measure the inter-vehicle distance regardless of weather conditions such as rainfall or snowfall, and which can be manufactured at a lower cost in comparison with the conventional apparatus using a radar.

Therefore, the present invention provides an inter-vehicle distance measuring system and apparatus for measuring a distance between a target vehicle ahead of a present vehicle (which is following the target vehicle) and the present vehicle, comprising:

in the target vehicle:
  a first detecting section for detecting first road-surface data indicating a condition of a road surface on which the target vehicle is currently driving; and
  a transmitting section for transmitting the first road-surface data to the present vehicle, and in the present vehicle:
  a receiving section for receiving the first road-surface data transmitted from the target vehicle;
  a second detecting section for detecting second road-surface data indicating a condition of a road surface on which the present vehicle is currently driving;
  a time difference calculating section for comparing the first and second road-surface data, and calculating and outputting a time difference between each detection time of the first and second road-surface data when the first and second road-surface data have the maximum correlation; and
  a computing section for calculating the inter-vehicle distance between the target vehicle and the present vehicle, based on the time difference output from the time difference calculating section.

In the above structure, the target vehicle transmits the first road-surface data, such as the roughness of the road surface, to the present vehicle. Also in the present vehicle, the second road-surface data such as the roughness is also detected, and both detected data are compared. In the present vehicle, the first and second road surface data having the maximum correlation are detected, and the time difference of each detection time of these data is calculated so as to calculate the inter-vehicle distance.

Accordingly, an inter-vehicle distance measuring system and apparatus employing a novel method (completely different from the inter-vehicle distance measuring system and apparatus using a radar) can be provided. In addition, the present apparatus is not affected by weather conditions such as rainfall or snowfall, and can be manufactured at a lower cost in comparison with the conventional apparatus using a radar.

The first and second detecting sections may be suspension stroke sensors for detecting strokes of changes of the suspension of each vehicle, or may be distance measuring sections for measuring a distance from the body of each vehicle to the road surface. In either case, the condition of the road surface below the vehicle can be accurately detected, thereby obtaining accurate road-surface data.

On the other hand, the first and second detecting sections may be sound detecting sections for detecting a sound generated by the suspension of each vehicle, or may be movement detecting sections for detecting contraction and extension of the suspension of each vehicle.

These detecting sections can be obtained at relatively low cost, thereby providing the apparatus at a lower cost.

Typically, the computing section calculates the inter-vehicle distance by multiplying the time difference output from the time difference calculating section by a driving speed of the present vehicle. In this case, the inter-vehicle distance can be calculated using a simple circuit arrangement.

When the compared first and second road-surface data have maximum overlap, the time difference calculating section may determine that both data have the maximum correlation.

On the other hand, when the compared first and second road-surface data have minimum non-overlap, the time difference calculating section may determine that both data have the maximum correlation.

In either case, the time difference for the road-surface data having the maximum correlation can be easily detected. Typically, the road-surface data is a waveform indicating the roughness of the road surface.

The present invention also provides an inter-vehicle distance measuring system and apparatus having two inter-vehicle distance measuring apparatuses as explained above, respectively provided for right and left wheels of each vehicle, wherein the inter-vehicle distance is determined based on results measured by the two inter-vehicle distance measuring apparatuses.

The present invention also provides an inter-vehicle distance measuring system and apparatus having an inter-vehicle distance measuring apparatus as explained above, and a radar inter-vehicle distance measuring apparatus provided in the present vehicle, wherein the inter-vehicle distance is determined based on results measured by the two inter-vehicle distance measuring apparatuses.

According to the above structure having a two-apparatus arrangement, the measurement accuracy can be improved, and the inter-vehicle distance measurement can be performed even if one of the apparatuses has a problem.

BRIEF DESCRIPTION OF THE DRAWINGS

FIGS. 4A to 4I are diagrams showing waveforms for explaining the operation of time difference computing element 21.

DESCRIPTION OF THE PREFERRED EMBODIMENTS

Hereinafter, embodiments according to the present invention will be explained with reference to the drawings.

Figure 1:
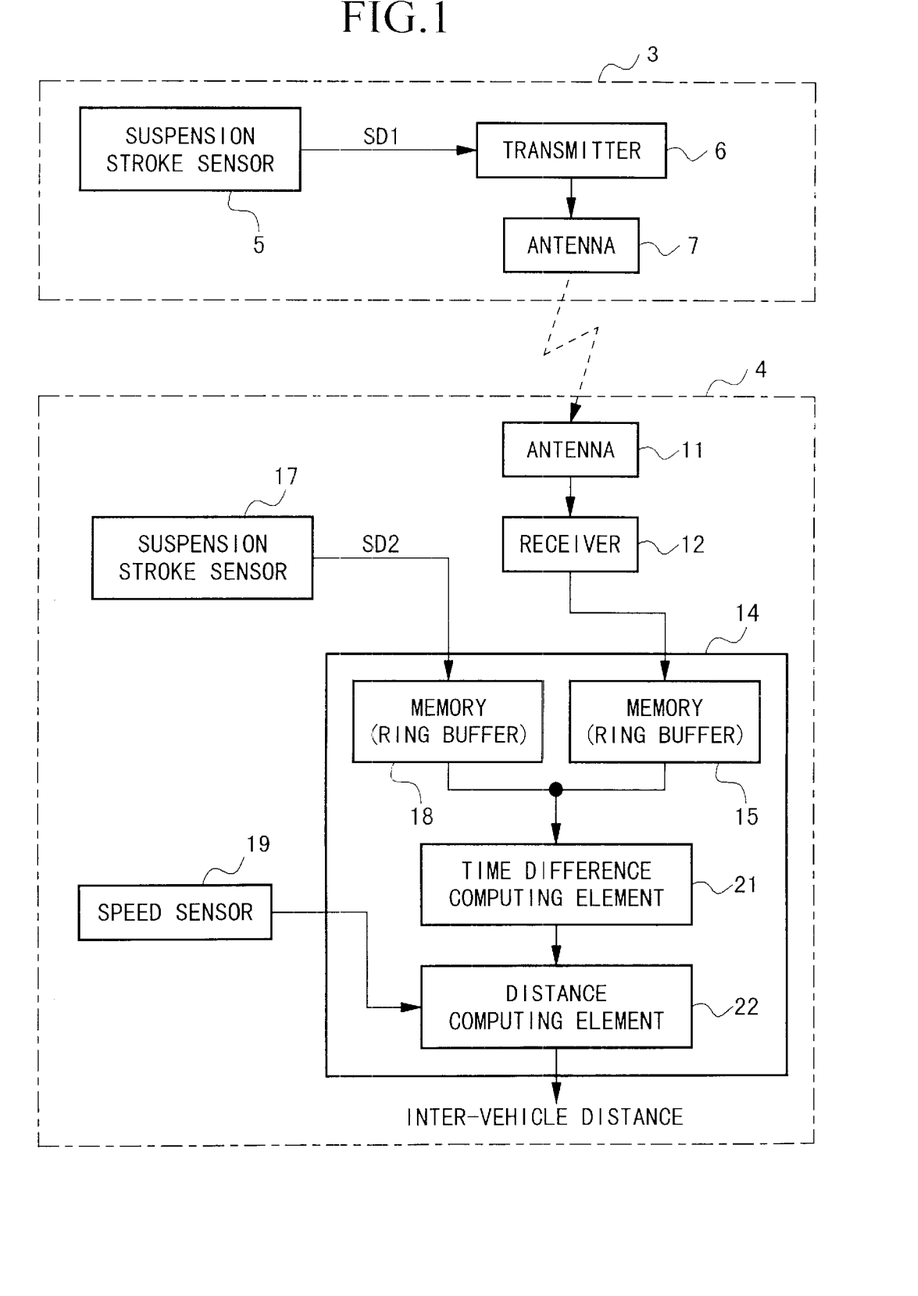
FIG. 1 is a block diagram showing the structure of the first embodiment according to the present invention.
Figure 2:
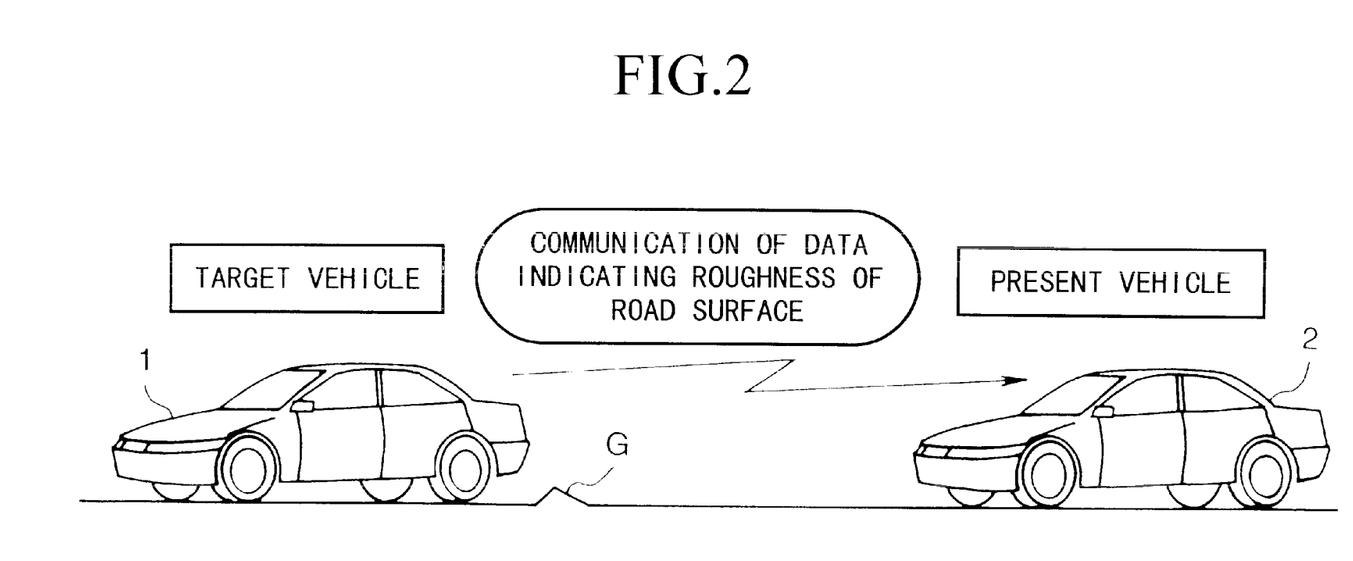
FIG. 2 is a diagram for explaining the operation of the first embodiment.

FIG. 1 is a block diagram showing the first embodiment of the inter-vehicle distance measuring system and apparatus of the present invention. FIG. 2 is a diagram for explaining the operation of the inter-vehicle distance measuring apparatus.

In FIG. 1, reference numeral 3 indicates a circuit block provided in a target vehicle 1 ahead of present vehicle 2 (see FIG., 2), and reference numeral 4 indicates a circuit block provided in the present vehicle 2. The target vehicle 1 may also be referred to as the lead vehicle, and the present vehicle may also be referred to as the trailing vehicle. In the circuit block 3, reference numeral indicates a suspension stroke sensor (corresponding to the first detecting section of the present invention) for measuring the stroke of the suspension (i.e., suspension stroke) for each predetermined elapsed time T, and outputting suspension stroke data SD1 (i.e., measured result corresponding to the first road-surface data of the present invention) to transmitter 6 (corresponding to the transmitting section of the present invention). The suspension stroke changes according to the roughness of the road surface; thus, the suspension stroke data SD1 indicates the roughness of the road surface. The transmitter 6 sends the suspension stroke data SD1 from antenna 7 to the present car 2 by carrying the data on a high-frequency carrier wave.

In the circuit block 4, reference numeral 11 indicates an antenna for receiving the high-frequency signal sent from the antenna 7 of the target vehicle 2, and the high-frequency signal received by antenna 11 is input into receiver 12 (corresponding to the receiving section of the present invention). The receiver 12 demodulates the input high-frequency signal so as to obtain the suspension stroke data SD1 of the target vehicle 1. The obtained data SD1 is then stored from the receiver 12 into memory (ring buffer) 15 in controller 14.

Reference numeral 17 indicates a suspension stroke sensor (corresponding to the second detecting section of the present invention) for detecting the suspension stroke of the present vehicle 2. This sensor measures the suspension stroke for each predetermined elapsed time T (explained above), and stores suspension stroke data SD2 (i.e., measured result corresponding to the second road-surface data of the present invention) in memory (ring buffer) 18 in controller 14.

Reference numeral 19 indicates a speed sensor for detecting the speed of the present vehicle 2, and outputting digital data indicating the detected speed. Reference numeral 21 indicates a time difference computing element (corresponding to the time difference calculating section of the present invention) for detecting the time difference between the road-surface roughness (condition) detection by the target vehicle 1 and the following road-surface roughness detection by the present vehicle 2, based on the data in memories 15 and 18. The computing element 21 outputs time difference (digital) data, indicating the detected result, to distance computing element 22 (corresponding to the computing section of the present invention). The time difference computing element 21 will be later explained in detail. The distance computing element 22 multiplies the above time difference data and the output data from the speed sensor 19 together, so as to calculate the inter-vehicle distance.

The operation of the above-explained inter-vehicle distance measuring apparatus will be explained with reference to FIGS. 3 and 4.

Figure 3:
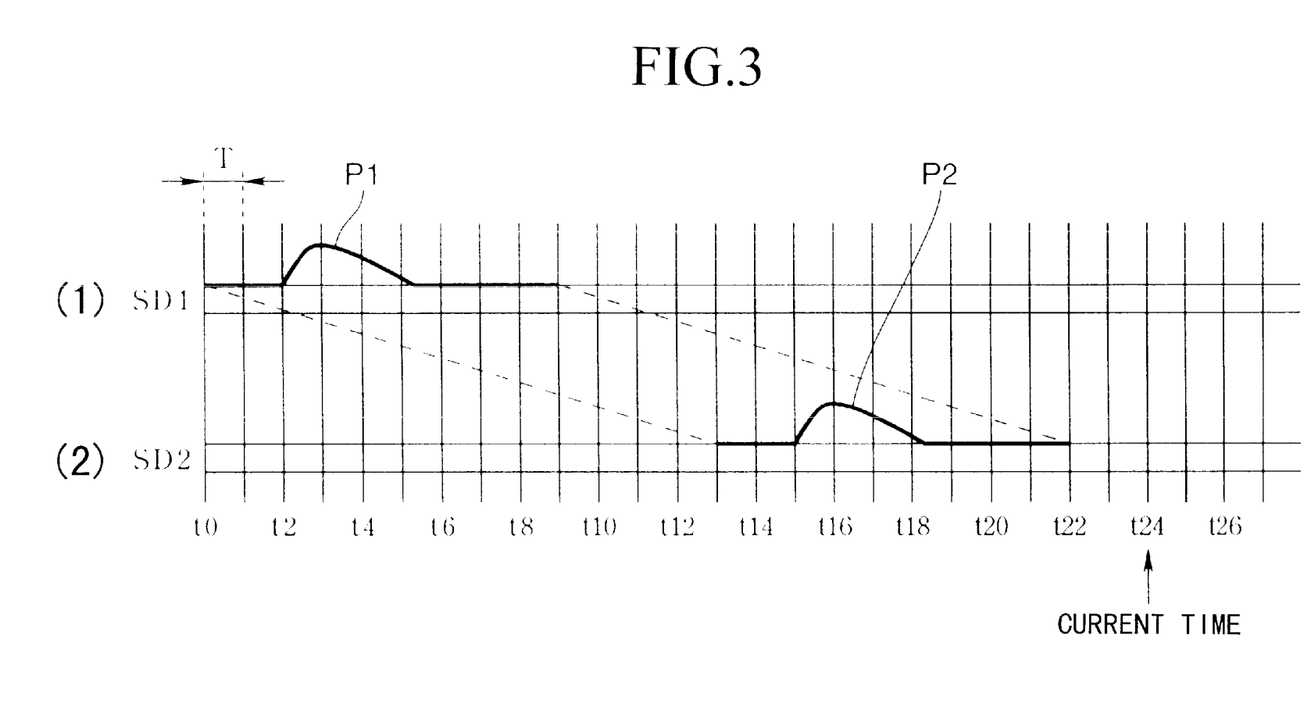
FIG. 3 is a diagram showing waveforms of data SD1 and SD2 output from suspension stroke sensors 5 and 17 in FIG. 1.

In FIG. 3, part (1) indicates suspension stroke data SD1 indicating the road surface condition measured by the target vehicle 1, while part (2) indicates suspension stroke data SD2 indicating the road surface condition measured by the present vehicle 2. Here, reference numerals P1 and P2 indicate peaks generated by projection G in the relevant road (see FIG. 2). In FIG. 3, each time t0, (t1: not shown in the graph), t2, . . . is sampling time, and at each sampling time t0, t1, t2, . . . , data SD1 and SD2 output from the suspension stroke sensors 5 and 17 are stored in memories 15 and 18.

Here, it is assumed that the current time is t24. Below, the operation of calculating the time difference between the target vehicle 1 and present vehicle 2 performed by time difference computing element 21 will be explained. First, the waveform from time t0 to time t9 of data SD1 (called "target waveform" in the following explanation: see the bold line in part (1)) is compared with the waveform from time t0 to time t9 of data SD2, and the overlapped area between the waveforms is calculated. Here, the above waveforms of data SD1 and SD2 are obtained when data SD1 and SD2 are respectively analog-displayed while the neighboring data points are connected. Next, the above target waveform of data SD2 is compared with the waveform from time t1 to t10 of data SD2, and the overlapped area is calculated. A similar operation is repeated until the time reaches t15 (that is, the waveform from time t15 to t24 of data SD2 is lastly used for comparison), so that the shaded areas shown in FIGS. 4A to 4E are calculated in turn in the above operation.

As clearly shown by these figures, when the overlapped area has the maximum value (see FIG. 4D), it is possible to determine that the waveform of data SD2 is approximately the same as the target waveform. That is, in the example related to FIG. 3, the waveform from time t13 to time t22 of SD2 is approximately the same as the target waveform. The time difference computing element 21 outputs the time difference between data SD1 and SD2 (i.e., t13−t0=13×T), obtained when both the waveforms approximately agree with each other, to distance computing element 22, as the time difference data between the target vehicle 1 and the present vehicle 2.

At time t25, the waveform from time t1 to t10 of data SD1 is then determined as the target waveform, and this waveform is compared with each waveform of data SD2 from time t1, so that the next time difference data between the target vehicle 1 and the present vehicle 2 is calculated by performing a similar operation.

In the distance computing element 22, each time difference data calculated by the above-explained operation is then multiplied by the corresponding output from the speed sensor 19, so that the distance, that is, inter-vehicle distance between the target vehicle 1 and the present vehicle 2, is calculated and is output in turn.

That is, in the present embodiment, the distance between the target vehicle and the present vehicle is calculated based on the time difference relating to the detection time of the roughness (condition) of the road surface. Therefore, it is possible to measure the inter-vehicle distance regardless of the weather conditions such as rainfall, wind, snowfall, and the like. In addition, in comparison with an inter-vehicle distance measuring apparatus using radar, the apparatus according to the present embodiment can be manufactured at a lower cost.

Figure 4A:
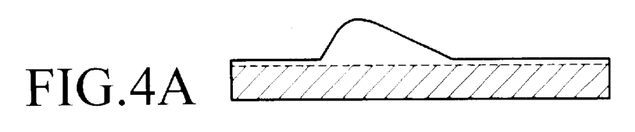
Figure 4B:
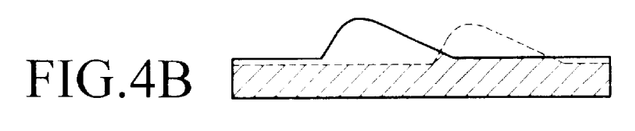
Figure 4C:
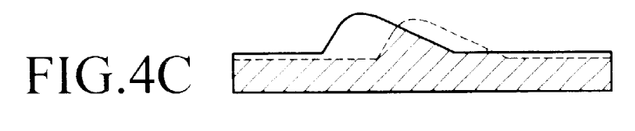
Figure 4D:
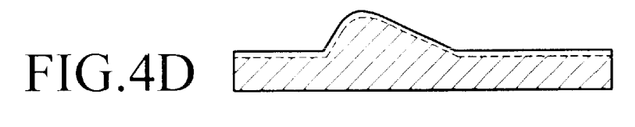
Figure 4E:
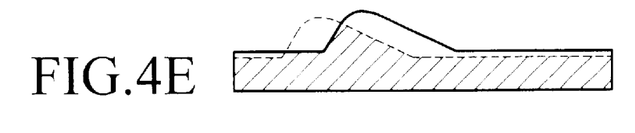
Figure 4F:
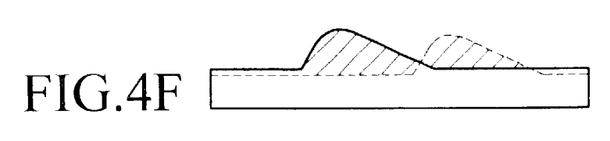
Figure 4G:
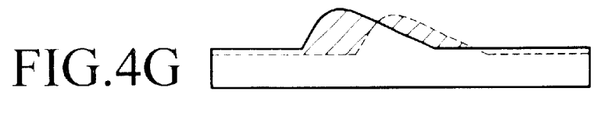
Figure 4H:
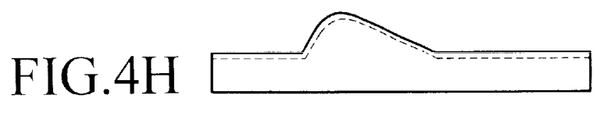
Figure 4I:
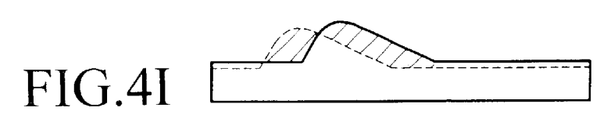

In the above embodiment, the waveform of data SD2 which has the maximum overlapped area with respect to the target waveform of data SD1 is detected as approximately the same waveform as the target waveform; however, as shown in FIGS. 4F to 4I, the waveform of data SD2 which has the minimum non-overlapped area with respect to the target waveform of data SD1 may be detected as approximately the same waveform (see FIG. 4H).

Also in the above embodiment, suspension stroke sensors 5 and 17 are used. However, instead of using these sensors, a laser beam or millimeter radio wave may be radiated from the vehicle to the road surface, so as to measure the roughness of the road surface by using a reflected wave of the radiated wave.

On the other hand, microphones may be used instead of the suspension stroke sensors 5 and 17. The suspension of the vehicle generates a sound every time the suspension moves in response to the roughness of the road surface. Therefore, when a microphone is attached to a root portion of the suspension so as to detect the sound of the suspension, the roughness of the road surface can be detected. Furthermore, motion sensors for detecting the contraction and extension of the suspension may be used instead of the suspension stroke sensors 5 and 17.

Also in the above embodiment, a single-circuit measuring-system is provided. However, it is possible that sensors for detecting the condition of the road surface are attached in the vicinity of each of the right and left wheels, and a two-circuit measuring system including two of the system arrangements as shown in FIG. 1 may be provided, so that the inter-vehicle distance can be determined based on the measured results of the two-circuit measuring system.

Figure 5:
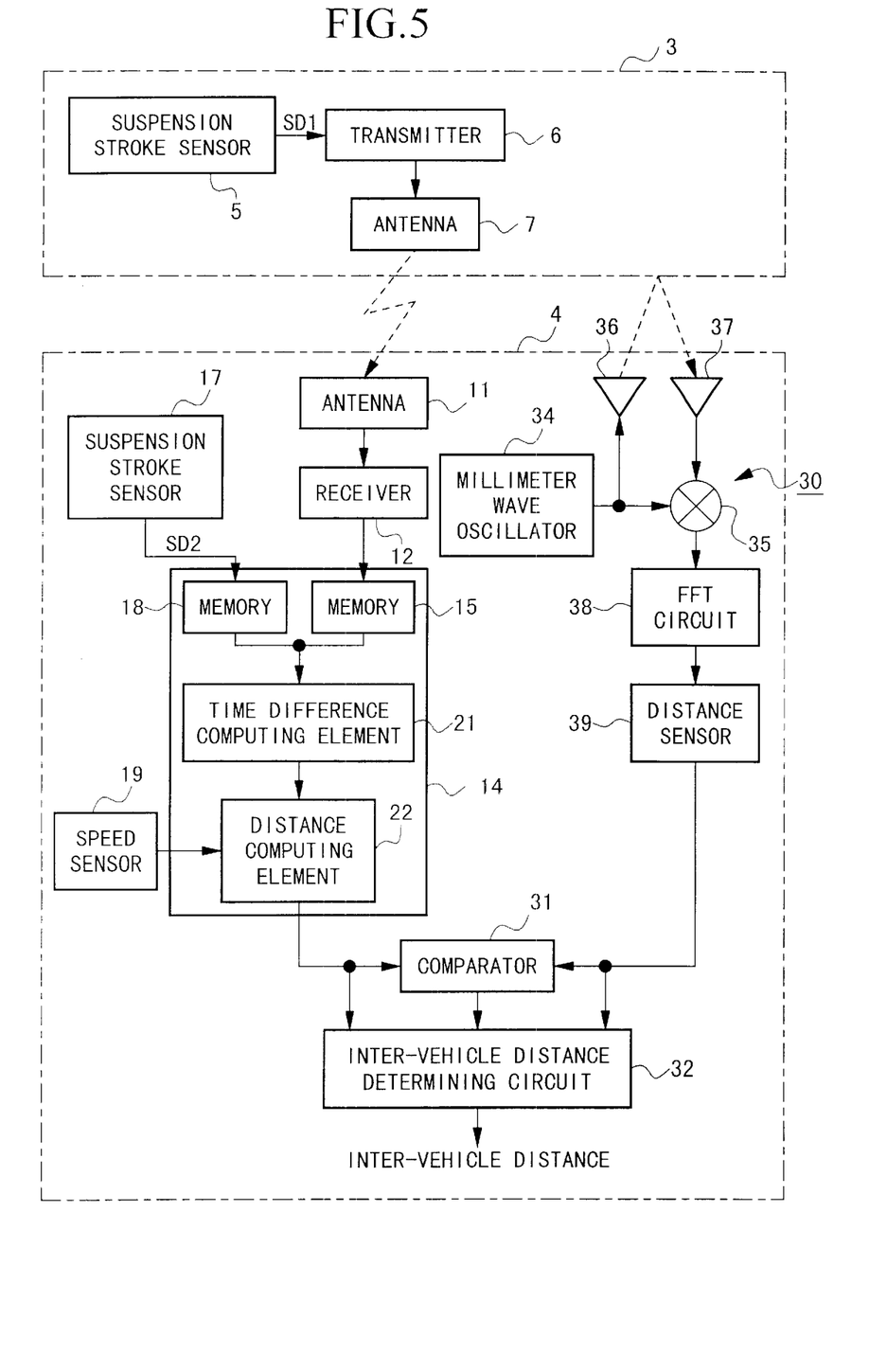
FIG. 5 is a block diagram showing the structure of the second embodiment according to the present invention.

Below, the second embodiment according to the present invention will be explained. FIG. 5 is a block diagram showing the structure of the second embodiment. In FIG. 5, parts identical to those in FIG. 1 are given identical reference numbers, and explanations thereof are omitted.

The difference between the structure shown in FIG. 5 and the structure shown in FIG. 1 is that radar inter-vehicle distance measuring apparatus 30 using a millimeter radio wave is provided in the circuit block 4 in the present vehicle 2, and that comparator 31 and inter-vehicle distance determining circuit 32 are also provided for determining the inter-vehicle distance based on the output of the distance computing element 22 and the output of the radar inter-vehicle distance measuring apparatus 30.

That is, in FIG. 5, reference numeral 34 indicates a millimeter wave oscillator for outputting a millimeter (radio) wave. The millimeter wave output from the millimeter wave oscillator 34 is output to mixer 35, and also is radiated from transmitting antenna 36 to target vehicle 1. A reflected wave from the target vehicle 1 is then received by receiving antenna 37, and the corresponding receiving signal is output to the mixer 35. The mixer 35 mixes the transmitted wave from the millimeter wave oscillator 34 with the received wave from the receiving antenna 37, so that a beat signal having a frequency corresponding to the distance between the target vehicle 1 and the present vehicle 2 is generated, and the generated beat signal is output to the FFT (fast Fourier transform) circuit 38.

The FFT circuit 38 detects the frequency of the beat signal by performing the FFT of the output signal of mixer 35, and outputs frequency data indicating the detected frequency to distance sensor 39. The distance sensor 39 collates the frequency data output from the FFT circuit 38 with data in a specific table provided in advance in the sensor, so as to detect the inter-vehicle distance corresponding to the relevant frequency data. The sensor 39 then outputs the detected distance data (i.e., inter-vehicle distance) to comparator 31 and inter-vehicle distance determining circuit 32.

The comparator 31 compares the inter-vehicle distance output from the distance computing element 22 with the inter-vehicle distance output from the above-explained distance sensor 39, and outputs the difference between the compared gaps to the inter-vehicle distance determining circuit 32. If the output from the comparator 31 is less than a predetermined value, then the inter-vehicle distance determining circuit 32 outputs the data output from the distance computing element 22 (or data output from distance sensor 39) as the determined inter-vehicle distance. While if the output from the comparator 31 is equal to or larger than the predetermined value, then the inter-vehicle distance determining circuit 32 outputs one of the output data which is closer to the previous measured value of the inter-vehicle distance, and emits a warming signal, and determines that the measuring apparatus which output the non-chosen data is in an abnormal state, and only measured data from the other measuring apparatus will be used after this determination.

Although there have been described what are the present embodiments of the invention, it will be understood that various changes and variations may be made there to without departing from the gist or spirit of the invention. The scope of the invention is indicated by the appended claims.

What is claimed is:

1. A method of measuring a distance between a leading vehicle and a trailing vehicle, comprising the steps of:

a) generating a first time-referenced data set, corresponding to a road surface, in a lead vehicle system associated with a lead vehicle which is traveling on said road surface;

b) transmitting said first data set from said lead vehicle to a trailing vehicle following behind said lead vehicle, and receiving said first data set in a receiver in said trailing vehicle;

c) generating a second time-referenced data set, corresponding to said road surface, in a trailing vehicle system associated with said trailing vehicle;

d) comparing said first and second data sets;

e) calculating a time difference between said leading and trailing vehicles using the results of said data set comparison; and f) computing an inter-vehicle distance between said leading and trailing vehicles based on the results from said time difference calculating step.

2. An inter-vehicle distance measuring system for measuring a distance between a target vehicle ahead of a present vehicle and the present vehicle, said distance measuring system comprising:

in the target vehicle:
first detecting means for detecting first road-surface data indicating a condition of a road surface on which the target vehicle is currently driving; and
transmitting means for transmitting the first road-surface data to the present vehicle, and in the present vehicle:
receiving means for receiving the first road-surface data transmitted from the target vehicle;
second detecting means for detecting second road-surface data indicating a condition of a road surface on which the present vehicle is currently driving;
time difference calculating means for comparing the first and second road-surface data, and calculating and outputting a time difference between each detection time of the first and second road-surface data when the first and second road-surface data have maximum correlation; and
computing means for calculating an inter-vehicle distance between the target vehicle and the present vehicle, based on the time difference output from the time difference calculating means.

3. An inter-vehicle distance measuring system as claimed in claim 2, wherein the first and second detecting means are suspension stroke sensors for detecting strokes of changes of the suspension of each vehicle.

4. An inter-vehicle distance measuring system as claimed in claim 2, wherein the first and second detecting means are distance measuring means for measuring a distance from the body of each vehicle to the road surface.

5. An inter-vehicle distance measuring system as claimed in claim 2, wherein the first and second detecting means are sound detecting means for detecting a sound generated by the suspension of each vehicle.

6. An inter-vehicle distance measuring system as claimed in claim 2, wherein the first and second detecting means are movement detecting means for detecting contraction and extension of the suspension of each vehicle.

7. An inter-vehicle distance measuring system as claimed in claim 2, wherein the computing section calculates the inter-vehicle distance by multiplying the time difference output from the time difference calculating section by a driving speed of the present vehicle.

8. An inter-vehicle distance measuring system as claimed in claim 2, wherein when the compared first and second road-surface data have maximum overlap, the time difference calculating means determines that both data have the maximum correlation.

9. An inter-vehicle distance measuring system as claimed in claim 2, wherein when the compared first and second road-surface data have minimum non-overlap, the time difference calculating means determines that both data have the maximum correlation.

10. The inter-vehicle distance measuring system of claim 2, comprising two inter-vehicle distance measuring apparatuses, one of such measuring apparatuses being respectively provided for each of the right and left sides of each vehicle, wherein the inter-vehicle distance is determined based on results measured by the two inter-vehicle distance measuring apparatuses.

11. An inter-vehicle distance measuring system having an inter-vehicle distance measuring system as claimed in claim 2, further comprising a radar inter-vehicle distance measuring system provided in the present vehicle, wherein the inter-vehicle distance is determined based on results measured by the two inter-vehicle distance measuring apparatuses.

12. An inter-vehicle distance measuring system for measuring the distance between a lead vehicle and a trailing vehicle, said system comprising a lead vehicle system and a trailing vehicle system,
wherein said lead vehicle system comprises:
a first road-surface detector for generating a first road-surface data set, and
a transmitter for sending said first road-surface data set to said trailing vehicle system;
and wherein said trailing vehicle system comprises:
a receiver for receiving said first road-surface data set from said transmitter;
a second road-surface detector for generating a second road-surface data set, and
a processor for comparing said first and second road-surface data sets and for calculating an inter-vehicle distance between the lead vehicle and the trailing vehicle.

13. The distance measuring system of claim 12, wherein the trailing vehicle system further comprises a vehicle speed sensor for measuring an instantaneous speed of the trailing vehicle.

14. The distance measuring system of claim 12, wherein the lead vehicle system further comprises a third road-surface detector, and the trailing vehicle system further comprises a fourth road-surface detector.

* * * * *

UNITED STATES PATENT AND TRADEMARK OFFICE
CERTIFICATE OF CORRECTION

PATENT NO. : 6,683,533 B1
DATED : January 27, 2004
INVENTOR(S) : Jun Ashihara and Hiroyuki Andou

It is certified that error appears in the above-identified patent and that said Letters Patent is hereby corrected as shown below:

Column 3,
Line 32, after "reference numeral" insert -- 5 --.

Column 7,
Line 40, delete "section" and insert -- means --.

Signed and Sealed this

First Day of June, 2004

JON W. DUDAS
*Acting Director of the United States Patent and Trademark Office*